US012742901B2

(12) United States Patent
Albuquerque et al.

(10) Patent No.: US 12,742,901 B2
(45) Date of Patent: Sep. 22, 2026

(54) COMPLEX WAVELET BASED FULL WAVEFORM INVERSION METHOD AND SYSTEM FOR PROCESSING SEISMIC DATA

(71) Applicant: CGG SERVICES SAS, Massy Cedex (FR)

(72) Inventors: Danilo Albuquerque, Rio de Janeiro (BR); Filipe Rudrigues, Niteroi (BR); Roberto Pereira, Rio de Janeiro (BR); Adel Khalil, Rio de Janeiro (BR)

(73) Assignee: CGG SERVICES SAS, Massy Cedex (FR)

( * ) Notice: Subject to any disclaimer, the term of this patent is extended or adjusted under 35 U.S.C. 154(b) by 440 days.

(21) Appl. No.: 18/485,744

(22) Filed: Oct. 12, 2023

(65) Prior Publication Data

US 2024/0319394 A1 Sep. 26, 2024

Related U.S. Application Data

(60) Provisional application No. 63/491,971, filed on Mar. 24, 2023.

(51) Int. Cl.

*G01V 1/34* (2006.01)
*G01V 1/28* (2006.01)
*G01V 1/30* (2006.01)

(52) U.S. Cl.

CPC .............. *G01V 1/345* (2013.01); *G01V 1/282* (2013.01); *G01V 1/303* (2013.01)

(58) Field of Classification Search

CPC ........ G01V 1/282; G01V 1/303; G01V 1/345; G01V 2210/67; G01V 2210/614
USPC ........................................................... 702/16
See application file for complete search history.

(56) References Cited

U.S. PATENT DOCUMENTS 10,976,457 B2 * 4/2021 Cooper .................. G01V 1/306
11,215,720 B2 * 1/2022 Wang ..................... G01V 1/282

OTHER PUBLICATIONS

Carey Bunks et al., "Multiscale seismic waveform inversion", Geophysics, Sep.-Oct. 1995, pp. 1457-1473, vol. 60, No. 5.
Ebru Bozdağ et al., "Misfit functions for full waveform inversion based on instantaneous phase and envelope measurements," Geophysical Journal International, 2011, pp. 845-870, vol. 185.

(Continued)

*Primary Examiner* — John H Le
(74) *Attorney, Agent, or Firm* — PATENT PORTFOLIO BUILDERS PLLC

(57) ABSTRACT

A method for seismic exploration using a full waveform inversion, FWI, the method including receiving an initial velocity model V of the subsurface, receiving recorded data d related to the subsurface, generating synthetic data u related to the subsurface, using the initial velocity model V and a source signature of a source S, transforming the recorded data d and the synthetic data u, with a complex wavelet transform, into complex wavelet transformed recorded data d' and complex wavelet transformed synthetic data u', respectively, updating the initial velocity model V using the FWI to generate an updated velocity model, based on a cost function J which depends on the complex wavelet transformed recorded data d' and the complex wavelet transformed synthetic data u', and generating an image of a surveyed subsurface formation.

12 Claims, 5 Drawing Sheets

(56) References Cited

OTHER PUBLICATIONS

Emmanuel Candès et al., "Fast Discrete Curvelet Transforms," Transforms: Multiscale Modeling & Simulation, 2006, pp. 861-899, vol. 5.
Ingrid Daubechies, "Orthonormal Bases of Compactly Supported Wavelets," Communications on Pure and Applied Mathematics, 1988, pp. 909-996, vol. LXI.
Ivan W. Selesnick et al., "The Dual-Tree Complex Wavelet Transform," IEEE Signal Processing Magazine, Nov. 2005, pp. 123-151.
J. Cooper et al., "Mitigating Cycle Skipping in Full-Waveform Inversion Using Partial Matching Filters," 2021, 82nd EAGE Annual Conference & Exhibition, Amsterdam, The Netherlands, 5 pages.
J. Virieux et al., "An overview of full-waveform inversion in exploration geophysics," Nov.-Dec. 2009, Geophysics, vol. 74, No. 6, pp. WCC1-WCC26.
M. Wang et al., "Dynamic-warping full-waveform inversion to overcome cycle skipping," 2016, SEG International Exposition and 86th Annual Meeting, pp. 1273-1277.
M. Warner et al., "Adaptive Waveform Inversion—FWI Without Cycle Skipping—Theory," 2014, 76th EAGE Conference & Exhibition 2014, 5 pages.
Michael Warner et al., "Full-elastic AVA extraction using acoustic FWI," Second International Meeting for Applied Geoscience & Energy, 2022, pp. 907-911.
Nick Kingsbury, "Complex Wavelets for Shift Invariant Analysis and Filtering of Signals," Applied and Computational Harmonic Analysis, 2001, pp. 234-253, vol. 10.
Odile Gauthier et al., "Two-Dimensional Nonlinear Inversion of Seismic Waveforms: Numerical Results," Geophysics, Jul. 1986, pp. 1387-1403, vol. 51, No. 7.
R. Poncet et al., "FWI with Optimal Transport: a 3D Implementation and an Application on a Field Dataset," Jun. 11-14, 2018, 80th EAGE Conference & Exhibition 2018, Copenhagen, Denmark, 5 pages.
R.-E. Plessix, "A review of the adjoint-state method for computing the gradient of a functional with geophysical applications," Geophysical Journal International, 2006, pp. 495-503, vol. 167.
Stephane G. Mallat, "A Theory for Multiresolution Signal Decomposition: The Wavelet Representation," IEEE Transactions on Pattern Analysis & Machine Intelligence, Jul. 1989, pp. 674-693, vol. 11, No. 7.
Y. Luo et al., "Wave-equation traveltime inversion," Geophysics, May 1991, pp. 645-653, vol. 56, No. 5.
Yong Hu et al., "Multi-scale time-frequency domain full waveform inversion with a weighted local correlation-phase misfit function," Journal of Geophysics and Engineering, 2019, pp. 1017-1031, vol. 16.
Zhigang Zhang et al., "Correcting for salt misinterpretation with full-waveform inversion," 2018, SEG International Exposition and 88th annual Meeting, Expanded Abstracts, pp. 1143-1147.
Zhiming Ren et al., "Multiscale viscoacoustic waveform inversion with the second generation wavelet transform and adaptive time-space domain finite-difference method," Geophysical Journal International, 2014, pp. 948-974, vol. 197.
Dong Li et al., "Time-lapse full waveform inversion based on curvelet transform: Case study of CO2 storage monitoring," International Journal of Greenhouse Gas Control, 2021, pp. 1-16.

* cited by examiner

S
R
S'
308
306
320
322

COMPLEX WAVELET BASED FULL WAVEFORM INVERSION METHOD AND SYSTEM FOR PROCESSING SEISMIC DATA

BACKGROUND OF THE INVENTION

Technical Field

Embodiments of the subject matter disclosed herein generally relate to a system and method for processing recorded seismic data for extracting information related to a formation in the subsurface, and more particularly, to various methods for using a Full Waveform Inversion (FWI) or its variants with a complex wavelet-based cost function for extracting the formation information.

Discussion of the Background

Hydrocarbon exploration and development uses waves (e.g., seismic waves or electromagnetic waves) to explore the structure of underground formations on land and/or at sea (i.e., formations under the seafloor). As schematically illustrated in FIG. 1, waves emitted by a source 110 at a known location penetrate an explored subsurface 120 and are reflected, refracted or diffracted at interfaces 112, 122, 124, 126 that separate the subsurface's layers or formations 121, 123, 125, 127 having different layer properties. Sensors 130 (only one is shown for simplicity), which may be towed by a boat 132 as streamers, or may be independently placed in the water or ocean bottom (not shown), detect the waves and record one or more of their characteristics, for example, pressure, one-dimensional displacement, three-dimensional displacement, etc. Note that, as used herein, the term "formation" refers to any geophysical structure into which source energy is injected to perform seismic surveying, e.g., land, ocean bottom, transition zone or marine based. This means that the configuration shown in FIG. 1 may also be used on land, in which case the source 110 is carried by a truck or other means from one point to another, and the sensors 130 are located on the surface, or buried in the subsurface. Note that the sensors 130 are known in the art and they can include hydrophones, accelerometers, geophones, gravitational sensors, electromagnetic sensors, etc.

In order to understand the structure of the explored underground formation (layers 121, 123, 125, and 127 and interfaces 112, 122, 124, and 126 in the specific example of FIG. 1), various steps are performed on the data "d"' recorded by sensors 130, as part of the processing of the recorded seismic data. One of those steps is FWI. FWI is a technique for deriving high-resolution models "V" of the subsurface (Earth) parameters (e.g., pressure-wave velocity "$v_p$", shear-wave velocity "$v_s$", viscosity, density "ρ", impedance, reflectivity, anisotropy, etc.), from seismic data recordings d. The model V may include one or more of these earth parameters, which are referred to herein using the general terms "velocity model" or "earth model" or "model." FWI is a nonlinear inversion scheme with the objective of determining subsurface properties for the model V which minimize a misfit between the observed/recorded/measured seismic data d (also described interchangeably as real or field here) and synthetic data, which is calculated/estimated from a candidate model V, which is an earth model or a model of the earth parameters. These earth models could have been calculated using, for example, travel time tomography on the seismic data, previous implementations of FWI on the seismic data, or well log information.

The misfit is commonly defined by an objective function that measures the least-squares data difference between the observed d and modelled data "u" (i.e., data calculated, for example, as discussed in Virieux, J., and Operto, S. An overview of full-waveform inversion in exploration geophysics: Geophysics, 74, no. 6, WCC1-WCC26). Other misfit functions may be used in the full waveform inversion, for example, an optimal transport (see, Poncet, R., J. Messud, M. Bader, G. Lambaré, G. Viguier, and Hidalgo, C. FWI with Optimal Transport: a 3D Implementation and an application on a Field Dataset. 80th EAGE Conference & Exhibition, Expanded Abstracts, We A12 02), an adaptive waveform (see, Warner, M. and Guasch, L. Adaptive Waveform Inversion—FWI Without Cycle Skipping—Theory. 76th EAGE Conference & Exhibition, Extended Abstracts, We E106 13), a dynamic warping (see, Wang, M., Y. Xie, W. Q. Xu, K. F. Xin, B. L. Chuah, F. C. Loh, T. Manning, and Wolfarth, S. Dynamic-warping full-waveform inversion to overcome cycle skipping. 86th SEG Annual International Meeting, Expanded Abstracts, 1273-1277), a partial matching (see, Cooper, J., Ratcliffe, A. and Poole, G. Mitigating cycle skipping in full-waveform inversion using partial matching filters. 82nd EAGE Conference & Exhibition, Extended Abstracts, p 1-5), or a time-lag (see, Zhang, Z., J. Mei, F. Lin, R. Huang, and Wang, P. Correcting for salt misinterpretation with full-waveform inversion: 88th SEG Annual International Meeting, Expanded Abstracts, 1143-1147) misfit function.

The term modelled data u refers to the synthetic data obtained from an earth model V. FWI is an iterative approach requiring an a priori initial model, which is then repeatedly updated via an inversion algorithm. In an ideal case, the updated model V will converge to the true model representing the observed data d. An exemplary flow of a conventional FWI process is presented in FIG. 2. This process starts by receiving in step 200 the initial velocity model, and in step 210, the recorded data d. Optionally, in step 205, the method may receive additional information about the subsurface, for example, anisotropy parameters, which are known from other surveys or methods. Then, the FWI performs a step 220 for generating the synthetic data set u, based on the model V and the recorded data d, followed by the step 230 of updating the current model V based on a comparison (objective function) between the synthetic data u and the recorded data d. The steps 220 and 230 are iteratively performed until a loop-exiting criterion, LEC, is met in step 232. The LEC may be related to a model's convergence or simply a predetermined number of iterations. In the case of complex models with multiple non-independent parameters, different subsets of the parameter values may be updated at different iterations. Then, the method generates in step 240 an image of the subsurface domain based on the updated model.

The nonlinear inversion problem discussed with regard to FIG. 2 connects the candidate earth model V and a wavefield u via a nonlinear forward operator G as follows:

$$G(V) = u. \tag{1}$$

The operator G describes how to generate a wavefield corresponding to the given model V. As such, it represents a propagation of a seismic source, or sources, through a medium described by V and according to a known wave equation. If M represents the true Earth model, and d the known observed wavefield, it is possible to write, based on equation (1):

$$G(M)=d. \tag{2}$$

The inversion scheme on which the traditional FWI is based, aims to find a model V which minimizes the misfit between the modelled data u of equation (1) and the observed data d of equation (2), typically in a least-squares sense. Iterative gradient-based inversion algorithms such as Steepest Descent, Conjugate Gradient, or Limited-memory Broyden-Fletcher-Goldfarb-Shanno (LBFGS) may be used to solve the inversion problem.

However, the traditional Least-Squares (LS) Full Waveform Inversion (FWI) cost function is known for its high non-linearity and its tendency to produce cycle-skip errors (Odile Gauthier, Jean Virieux, and Albert Tarantola, (1986), "Two-dimensional nonlinear inversion of seismic waveforms: Numerical results," *GEOPHYSICS* 51: 1387-1403., doi.org/10.1190/1.1442188). Additionally, uncertainties on the density model and the incomplete physics used in modeling engines can lead to unreliable modeled amplitudes. To address these limitations, travel-time based cost functions have been proposed (Luo, Y., and G. T. Schuster, 1991, Wave-equation traveltime inversion: Geophysics, 56, 645-653, and Zhang et al. [2018], see above). They focus on the travel-time difference between events, reducing non-linearity and avoiding the amplitude related limitations of the inversion.

The conventional FWI uses a least-square (LS) cost function $J_{LS}$ to evaluate the discrepancy between the modeled synthetic data, u, and the measured real data, d, in time domain:

$$J_{LS}=\sum_{s,r,t}(d(t)-u(t))^2, \tag{3}$$

where t is the time index, and s and r are the source and receiver index, respectively. Even when travel-time based cost functions are selected, the problems discussed above (high non-linearity, cycle-skip errors) still plague the calculations associated with the FWI.

Thus, there is a need for a new cost function to be used with the FWI for overcoming the above noted problems.

SUMMARY OF THE INVENTION

According to an embodiment, there is a method for seismic exploration using a full waveform inversion, FWI, and the method includes receiving an initial velocity model V of the subsurface, receiving recorded data d related to the subsurface, generating synthetic data u related to the subsurface, using the initial velocity model V and a source signature of a source S, which is used to generate waves into the subsurface, transforming the recorded data d and the synthetic data u, with a complex wavelet transform, into complex wavelet transformed recorded data d' and complex wavelet transformed synthetic data u', respectively, allowing for natural separation between kinematics and dynamics trough phase and amplitude, updating the initial velocity model V using a full waveform inversion, FWI, to generate an updated velocity model, based on a cost function J which depends on the complex wavelet transformed recorded data d' and the complex wavelet transformed synthetic data u', and generating an image of a surveyed subsurface formation in the subsurface based on the updated velocity model, wherein the formation is used to locate natural resources.

According to another embodiment, there is a computing device for imaging a formation into a subsurface, and the computing device includes an interface configured to receive an initial velocity model V of the subsurface, and to receive recorded data d related to the subsurface, and a processor connected to the interface. The processor is configured to generate synthetic data u related to the subsurface, using the initial velocity model V and a source signature of a source S, which is used to generate waves into the subsurface, transform the recorded data d and the synthetic data u with a complex wavelet transform into complex wavelet transformed recorded data d' and complex wavelet transformed synthetic data u', respectively, update the initial velocity model V using a full waveform inversion, FWI, to generate an updated velocity model, based on a cost function J which depends on the complex wavelet transformed recorded data d' and the complex wavelet transformed synthetic data u', and generate an image of the formation in the subsurface based on the updated velocity model, wherein the formation is used to locate natural resources.

According to yet another embodiment, there is a non-transitory computer readable medium including computer executable instructions, wherein the instructions, when executed by a processor, implement the methods discussed herein.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
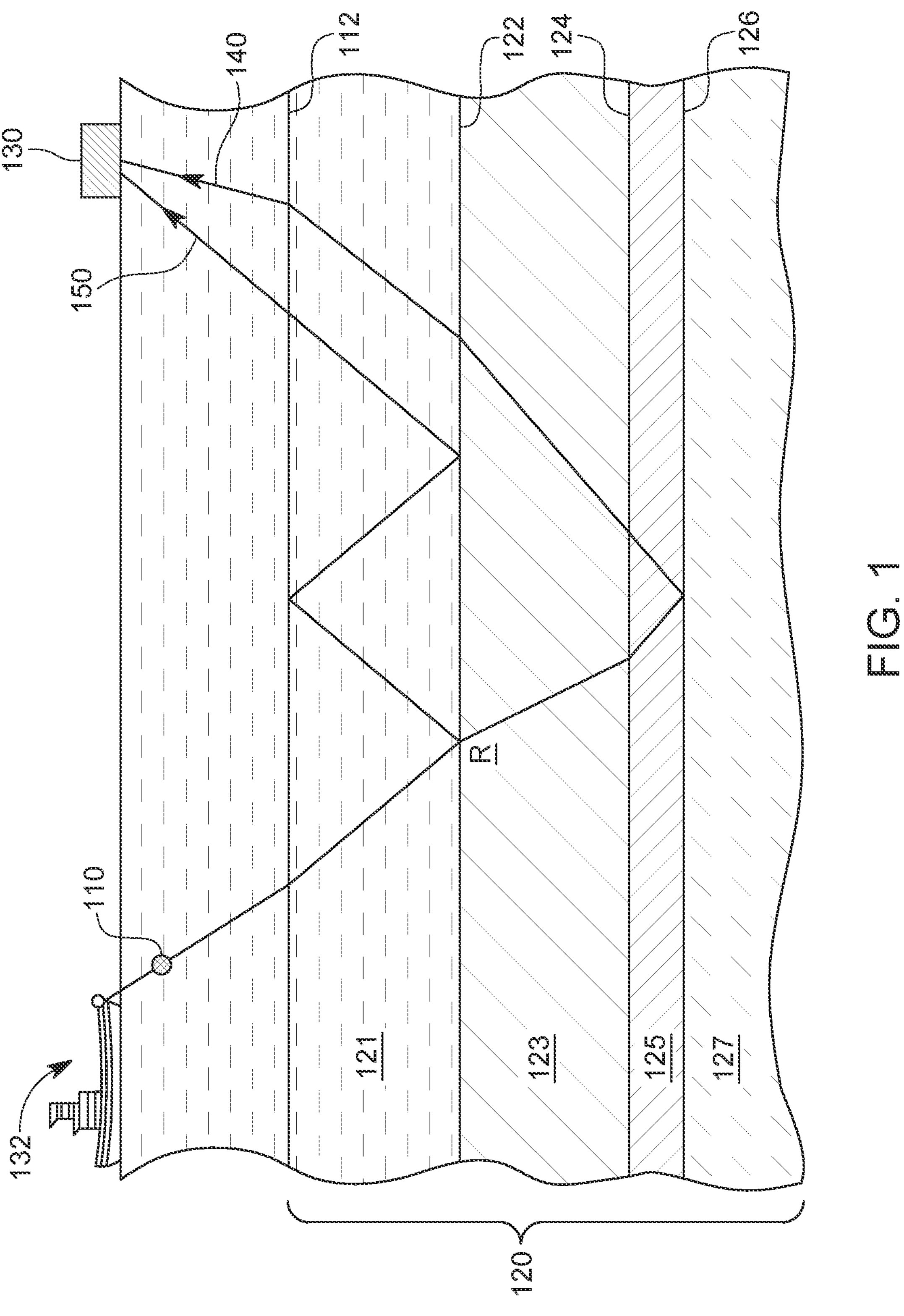
FIG. 1 is a schematic diagram of a marine based seismic acquisition system.
Figure 2:
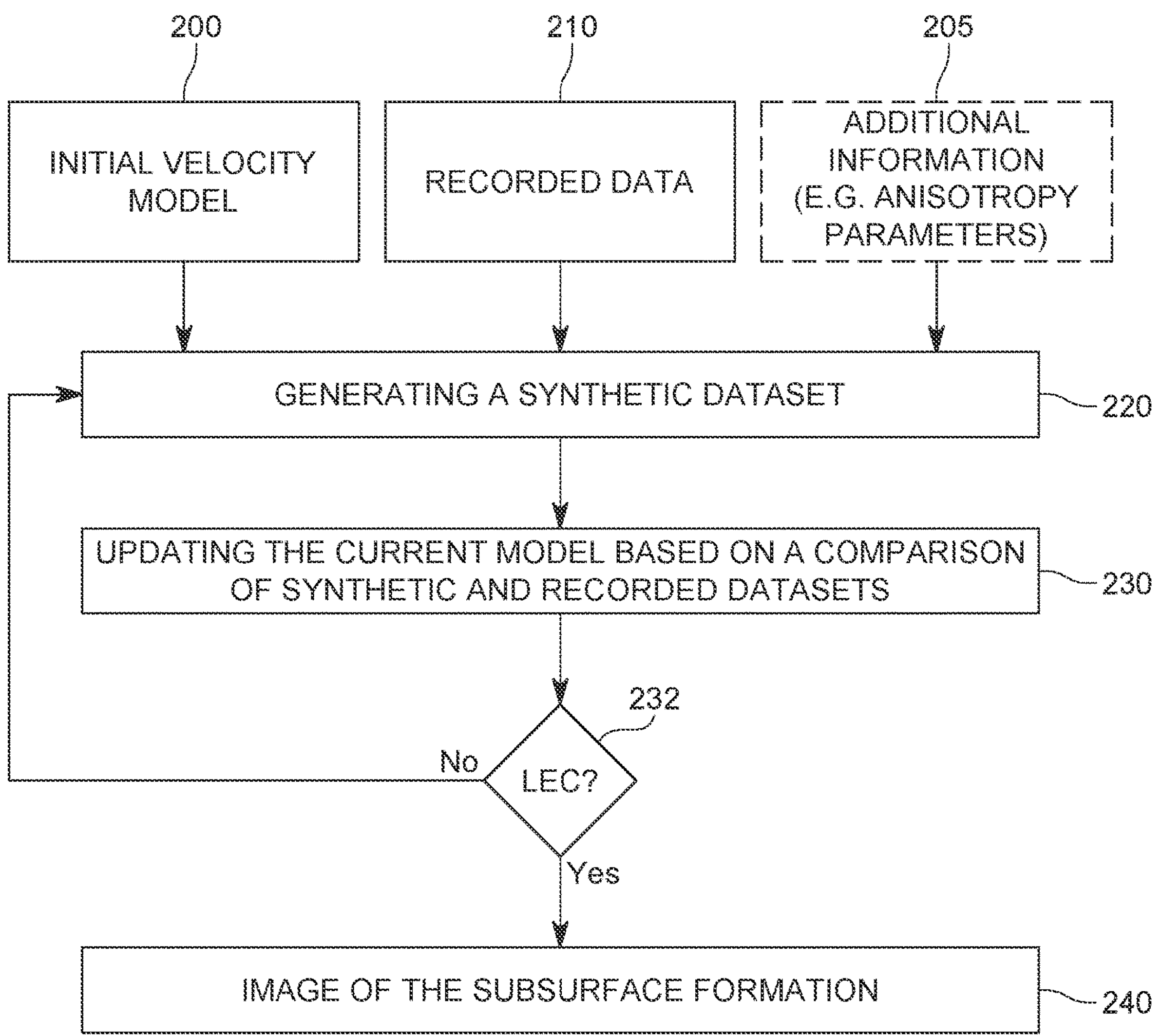
FIG. 2 is a schematic flow chart of a method that uses FWI for updating an earth's model and then generating an image of the subsurface based on the updated model.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed with regard to a modified FWI process that uses a complex wavelet based cost function for more accurately capturing the parameters associated with the surveyed area/volume, using terminology of seismic data processing. However, the embodiments to be discussed next are not limited to seismic data, but may be applied to other types of data, for example, electromagnetic wave data or acoustic data. Also, the embodiments discussed herein are not limited to applying the complex wavelet based cost function only to the FWI processing, but the cost function may be applied to other processes, for example, least squares migration.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

A well-established method for avoiding cycle-skip and reducing the non-linearity of the inversion (i.e., the problems plaquing the existing FWI approaches) is the multiscale strategy developed in [1]. This approach is based on performing FWI from low to high frequency, rather than all frequencies at once. The inventors have noted that Wavelets Transforms [2, 3] offer a natural way to decompose the data into different scales, making wavelet decomposition a viable approach for multi-scaling in FWI. Moreover, by decomposing seismic data into complex wavelets, it is possible to isolate the phase, 0, which can be used to design new kinematics focused FWI cost functions. For instance, the Dual-Tree Complex Wavelet Transform (DTCWT) [4, 5] is a suitable choice for the definition of new cost functions, as it provides frequency-based scale decomposition of a trace and allows for the analysis of both amplitude and phase at different scales.

It is also possible to extend this treatment to higher dimensions and, instead of decomposing each trace individually (1D transform), decompose the whole shot gather into frequency/wavenumber scales. The use of multidimensional decomposition techniques, such as the Curvelet Transform [6], enables the design of new FWI cost functions that act on a sparser decomposition of the data, better separating event from noise and leveraging on event continuity in the channel direction.

Thus, according to an embodiment, the cost function of the FWI processing is selected to be a complex wavelet-based function to leverage the natural separation between amplitude (dynamics) and phase (kinematics) of the data, enabling the user of the method to focus on the kinematics update when the amplitude of the events is inaccurate, and thus reducing the non-linearity of the problem. When a better modeling engine, such as elastic modeling, is used, and the amplitude of the events can be trusted, then it is possible to directly focus on the amplitude of the complex wavelet coefficients.

It is also worth noting that recent results suggest that accurate amplitude versus offset (AVO) measurements can be directly extracted from acoustic FWI [7]. The proposed method relies on dividing the input data into offset ranges and performing true-amplitude FWI independently for each subset of the dataset. By performing FWI using an amplitude cost function, it is possible to better isolate dynamics effects, which is the focus of the measurement, and ensure that residual kinematic differences across different offset classes will not impact the AVO estimation.

In one application, the cost function is selected based on complex curvelet transforms. Details about the configuration of the cost function are now discussed.

As noted above, the FWI uses a cost function to minimize a misfit between the measured data, d, and the modeled synthetic data, u, and this function is typically selected to be an LS cost function as discussed above with regard to equation (3). Note that the traditional cost function $J_{LS}$ may use both the phase and the amplitude of the data, which makes the function unreliable, as the amplitude is usually not accurately known. By using a complex curvelet transform in the cost function, the amplitude and the phase of the data can be naturally separated, so that only one of them is used in the FWI process. For example, the phase and amplitude cost functions may be written as:

$$J_\theta = \sum_{s,r,x} (\theta_d(x) - \theta_u(x))^2,\ J_A = \sum_{s,r,x} (A_d(x) - A_u(x))^2, \tag{4}$$

where θ is the phase of the data and A is the amplitude of the data, and s and rare the source and receiver index, respectively.

The summation in equation (4) is extended to all the coefficients of the particular complex wavelet transform chosen, therefore the index x is dependent on the transform. In the case of a 2D cost function (i.e., a 2D complex wavelet transform), the event continuity in both time and space is used to obtain a more robust estimation of the adjoint source with the ability to separate events with conflicting dips, such as multiples. In addition, the curvelet scale decomposition gives this method a natural multi-scaling strategy: by inverting the different scales incrementally, from coarsest to finest, the inversion engine will multiscale not only in frequency, but also in wavenumber. This motivates a general wavenumber multi-scaling approach that, together with frequency multi-scaling, has the potential to produce an even wider global minimum attraction basin and help mitigate the issue of local minima.

Note that wavelet/curvelet multiscaling has already been employed by other researchers [8, 9]. However, in these works, the transform is used only as a multiscaling tool, by decomposing the data into different scales and dips, and the separation between phase and amplitude is not employed. The proposed complex wavelet cost functions naturally incorporate the multiscaling observed in the cited studies, while also improving convergence by focusing on kinematics and/or dynamics.

Moreover, recent studies have been proposed where phase focused FWI are used to reduce the non-linearity of the inversion. For instance, [10] uses a Gabor transform, which can be treated as a short-time Fourier Transform, to construct a phase cost function. While [11] uses the Hilbert Transform to construct a complex seismic signal, from which the phase can be isolated and used to construct the phase cost function. However, it is worth noting that these approaches lack two important characteristics when compared to the proposed approach. Firstly, they do not possess the inherent multiscaling property found in complex wavelet transforms. Secondly, when utilizing a 2D complex wavelet transform, such as the Curvelet Transform, it becomes possible to separate superposed events into different dips during the cost function and adjoint source computation. This capability significantly enhances the accuracy of phase measurement.

Before discussing various phase and amplitude cost-functions for the specific cases of the DTCWT and the Curvelet Transform, which are implementations of the complex wavelet transform, a brief introduction to the wavelet transform is believed to be in order. The discrete wavelet transform, DWT, replaces the infinitely oscillating sinusoidal basis functions of the Fourier transform with a set of locally oscillating basis functions called wavelets. In this framework, the wavelets are stretched and shifted versions of a fundamental, real-valued bandpass wavelet $\psi(t)$, which is considered to be the "mother" of all wavelets. When the fundamental wavelet is carefully chosen and combined with shifts of a real-valued low-pass scaling function $\phi(t)$, they form an orthonormal basis expansion for one-dimensional (1-D) real-valued continuous-time signals. This means that finite-energy recorded data x(t) can be decomposed in terms of wavelets and scaling functions via:

$$x(t)=\sum_{j=0}^{\infty}\sum_{n=-\infty}^{\infty}c(j,n)2^{j/2}\psi(2^{j}t-n), \tag{5}$$

where j is a scale factor, c(n) is a scaling coefficient, and c(j, n) are wavelet coefficients, and they are computed through inner products:

$$c(n)=\int_{-\infty}^{\infty}x(t)\phi(t-n)\,dt. \tag{6}$$

These coefficients provide a time-frequency analysis of the data x(t) by measuring its frequency content (through scale factor) at different times (through time shift n). There are efficient, linear time complexity algorithms to compute the coefficients c(n) and d(j, n) from a fine-scale representation of the signal and vice-versa. The wavelets provide an optimal representation for many signals that include singularities (e.g., jumps and spikes). Further, the wavelet representation of such signals is optimally sparse, requiring an order of magnitude fewer coefficients than the Fourier basis for a same error.

Complex Wavelet Transforms (CWT) are a complex valued extension of the are Wavelet Transforms. The associated transform coefficients, being complex valued, can be decomposed into phase and amplitude, which can be used to formulate novel cost functions that isolate kinematics and dynamics in FWI. Note that by focusing on the phase of the events, this new cost function will try to correct for kinematics, which makes it a suitable alternative to the TLFWI or Dynamic Warping (cited in the "Discussion of the Background" section, for instance, which already focus on the kinematics, but would also include the natural multi-scaling and, if done in 2D, the separation of events in different dips.

Equations (5) and (6) can be changed into this general complex wavelet framework $$x(t)=\sum_{w}c(w)\psi_{w}(t), \tag{7}$$

where w is the complete set of parameters of this complex wavelet transform, e.g., scale, shifts and dips, $\psi_w(t)$ is the complex transform mother wavelet, c(w) is the complex wavelet coefficient, and it is computed through the inner product:

$$c(w)=\int_{-\infty}^{\infty}x(t)\psi_{w}(t)\,dt. \tag{8}$$

These coefficients provide a time-frequency analysis of the data x(t) by measuring its frequency content (through scale factor) at different times (through time shifts) which for simplicity are absorbed into w.

The above coefficients are complex numbers, and can then be written as $$c(w)=A(w)e^{i\theta(w)}, \tag{9}$$

with the amplitude given by:

$$A(w)=\left[\Re[c(w)]^{2}+\Im[c(w)]^{2}\right]^{\frac{1}{2}} \tag{10}$$

and the phase given by:

$$\theta(w)=\arctan\left[\frac{\Im[c(w)]}{\Re[c(w)]}\right], \tag{11}$$

thus allowing to define FWI cost functions which focus specifically on the phase θ and/or amplitude A of the complex wavelet coefficients of the shot gather. In these equations, $\Re[v]$ and $\Im[v]$ represent the real and imaginary part of the complex number v, respectively.

The complex wavelet-based cost functions are then constructed as a function of the amplitude and/or phase. The cost function needs to be differentiable and thus, it is chosen to improve convergence, with the actual dependence on amplitude and phase being dependent on several factors, e.g., the type of model update desired (kinematic, dynamic, or a combination), the type of noise observed in the data (gaussian, non-gaussian). In the following, examples of cost function are shown, and these will be used to derive the adjoint source in later section. These examples are shown due to their simplicity and those skilled in the art will be empowered to devise other cost functions based on phase and/or amplitude suitable to the geological context and data quality of the survey and to compute the associated adjoint sources.

A phase cost function, $J_\theta$, may be defined as:

$$J_{\theta}(u,d)=\frac{1}{2}\sum_{r}\sum_{w}[\Delta\theta(w)]^{2}, \tag{12}$$

where r denotes the receiver index.

In a similar manner, an amplitude cost function, $J_A$, may be defined as:

$$J_{A}(u,d)=\frac{1}{2}\sum_{r}\sum_{w}[\Delta A(w)]^{2}. \tag{13}$$

For instance, the DTCWT transform uses two separate DWT decompositions to calculate the complex transform of a signal. The DTCWT is considered to be an enhancement of the wavelet transform, by having additional properties, e.g., it is computationally more efficient. A first modification of the wavelet transform of equations (5) to (7) is the introduction of the complex wavelet transform (CWT), represented as $$\psi_c(t)=\psi_r(t)+j\psi_i(t), \tag{14}$$

where the index "r" stands for the real part and the index "i" stands for the imaginary part. Therefore, the coefficients introduced in equations (6) and (7) will also have real and imaginary parts. The complex wavelet transform enables new coherent multiscale signal processing algorithms that exploit the complex magnitude and phase.

Next, the dual-tree approach is implemented to the CWT. The idea behind the dual-tree approach is to use two real discrete wavelet transforms (DWTs). The first DWT gives the real part of the transform while the second DWT gives the imaginary part. Two filter banks are used for the analysis and synthesis of the DTCWT.

For this approach, the scaling coefficients, c(n), and the wavelet coefficients, d(j, n), which are the DWT coefficients associated with the modeled and real data, u(t) and d(t), respectively, are written as:

$$c_u(n)=\int_{-\infty}^{+\infty}u(t)\phi(t-n),\ d_u(j,n)=\int_{-\infty}^{+\infty}u(t)\psi(2^jt-n), \tag{15}$$

and $$c_d(n)=\int_{-\infty}^{+\infty}d(t)\phi(t-n),\ d_d(j,n)=\int_{-\infty}^{+\infty}d(t)\psi(2^jt-n). \tag{16}$$

The modeled and real data can be obtained from their curvelet coefficients through the reconstruction formula:

$$u(x)=\sum_{n=-\infty}^{+\infty}c_u(n)\phi(t-n)+\sum_{j=0}^{+\infty}\sum_{n=-\infty}^{+\infty}d_u(j,n)2^{j/2}\psi(2^jt-n), \tag{17}$$

and $$d(x)=\sum_{n=-\infty}^{+\infty}c_d(n)\phi(t-n)+\sum_{j=0}^{+\infty}\sum_{n=-\infty}^{+\infty}d_d(j,n)2^{j/2}\psi(2^jt-n). \tag{18}$$

In the case of the DTCWT, two filter banks (see [5] for details about the filter banks) are used to construct the real and imaginary parts of the DTCWT coefficients, with one of them being approximately the Hilbert Transform of the other:

$$\phi_c(t)=\Re[\phi_c(t)]+i\Im[\phi_c(t)],\ \psi_c(t)=\Re[\psi_c(t)]+i\Im[\psi_c(t)] \tag{19}$$

$$\Im[\phi_c(t)]\approx\mathcal{H}[\Re[\phi_c(t)]],\ \Im[\psi_c(t)]\approx\mathcal{H}[\Re[\psi_c(t)]]. \tag{20}$$

In this case, the reconstruction formula is now the following for the case of the modeled data:

$$u(x)=\frac{1}{2}\Bigg[\sum_{n=-\infty}^{+\infty}\Re[c_u(n)]\Re[\phi_c(t-n)]+ \tag{21}$$

-continued $$\sum_{j=0}^{+\infty}\sum_{n=-\infty}^{+\infty}\Re[d_u(j,n)]2^{j/2}\Re[\psi_c(2^jt-n)]+$$

$$\sum_{n=-\infty}^{+\infty}\Im[c_u(n)]\Im[\phi_c(t-n)]+\sum_{j=0}^{+\infty}\sum_{n=-\infty}^{+\infty}\Im[d_u(j,n)]2^{j/2}\Im[\psi_c(2^jt-n)]\Bigg].$$

The amplitude and phase of the DTCWT coefficients can be defined as:

$$A_c^u(n)=\left[(\Re[c_u(n)])^2+(\Im[c_u(n)])^2\right]^{\frac{1}{2}}, \tag{22}$$

$$A_d^u(n)=\left[(\Re[d_u(n)])^2+(\Im[d_u(n)])^2\right]^{1/2}$$

and $$\theta_u^c(n)=\arctan\left[\frac{\Im[c_u(n)]}{\Re[c_u(n)]}\right],\ \theta_u^d=\arctan\left[\frac{\Im[d_u(n)]}{\Re[d_u(n)]}\right]. \tag{23}$$

Based on the DTCWT formalism introduced in equations (14) to (23), a novel phase cost function, $J_\theta$, may be defined as $$J_\theta(u,d)=\frac{1}{2}\sum_r\sum_{j,n}[\Delta\theta(j,n)]^2. \tag{24}$$

Following the adjoint-state method discussed in [12], it is possible to write the adjoint-source as:

$$\begin{aligned}\frac{\partial J_\theta}{\partial u}=-\sum_r\int dt\Bigg[&\sum_{n=-\infty}^{+\infty}\frac{\Delta\theta_c(n)}{|c_u(n)|^2}\Im[c_u(n)]\phi_r(t-n)+\\&\sum_{j=0}^{+\infty}\sum_{n=-\infty}^{+\infty}\frac{\Delta\theta_d(j,n)}{|d_u(j,n)|^2}2^{\frac{j}{2}}\Im[d_u(n)]\psi_r(2^jt-n)-\\&\sum_{n=-\infty}^{+\infty}\frac{\Delta\theta_c(n)}{|c_u(n)|^2}\Re[c_u(n)]\phi_I(t-n)-\\&\sum_{j=0}^{+\infty}\sum_{n=-\infty}^{+\infty}\frac{\Delta\theta_d(j,n)}{|d_u(j,n)|^2}2^{\frac{j}{2}}\Re[d_u(n)]\psi_I(2^jt-n)\Bigg].\end{aligned} \tag{25}$$

The adjoint-state method allows to compute the gradient direction of the model update by the derivative of the cost function with respect to one or more of its parameters by combining the synthetic forward wavefield and an adjoint wavefield governed by a set of adjoint equations and adjoint subsidiary conditions. The adjoint problem's principal characteristic in seismology is its time reversal, meaning that the adjoint problem consists of a propagation of the observed waveform residuals backward in time, from the receiver to the source.

It is possible to define auxiliary coefficients, $\tilde{c}_u(n)$ and $\tilde{d}_u(j,n)$, as follows:

$$\tilde{c}_u(n)=\frac{\Delta\theta_c(n)}{|c_u(n)|^2}ic_u(n),\ \tilde{d}_u(j,n)=\frac{\Delta\theta_d(j,n)}{|d_u(j,n)|^2}id_u(j,n), \tag{26}$$

and rewrite the adjoint source of equation (25) as:

$$\frac{\partial J_\theta}{\partial u} = -\sum_r \int dt \left[ \sum_{n=-\infty}^{+\infty} \Re[\tilde{c}_u(n)]\phi_r(t-n) + \sum_{j=0}^{+\infty}\sum_{n=-\infty}^{+\infty} 2^{\frac{j}{2}} \Re[\tilde{d}_u(n)]\psi_r(2^j t - n) + \sum_{n=-\infty}^{+\infty} \Im[\tilde{c}_u(n)]\phi_I(t-n) + \sum_{j=0}^{+\infty}\sum_{n=-\infty}^{+\infty} 2^{\frac{j}{2}} \Im[\tilde{d}_u(n)]\psi_I(2^j t - n) \right]. \tag{27}$$

The terms inside brackets can be seen as the reconstruction formula of the rotated and rescaled modeled coefficients.

In a similar way, it is possible to introduce a novel amplitude cost function, $J_A$, which may be defined as:

$$J_A(u, d) = \frac{1}{2}\sum_r \sum_{j,n} [\Delta A(j, n)]^2. \tag{28}$$

Following the adjoint-state method, it is possible to write the adjoint-source as:

$$\frac{\partial J_A}{\partial u} = -\sum_r \int dt \left[ \sum_{n=-\infty}^{+\infty} \frac{\Delta A_c(n)}{|c_u(n)|} \Re[c_u(n)]\phi_r(t-n) + \sum_{j=0}^{+\infty}\sum_{n=-\infty}^{+\infty} \frac{\Delta A_d(j, n)}{|d_u(j, n)|} 2^{\frac{j}{2}} \Re[d_u(n)]\psi_r(2^j t - n) + \sum_{n=-\infty}^{+\infty} \frac{\Delta A_c(n)}{|c_u(n)|} \Im[c_u(n)]\phi_I(t-n) + \sum_{j=0}^{+\infty}\sum_{n=-\infty}^{+\infty} \frac{\Delta A_d(j, n)}{|d_u(j, n)|} 2^{\frac{j}{2}} \Im[d_u(n)]\psi_I(2^j t - n) \right]. \tag{29}$$

Similar to the phase cost function discussed above, it is possible to define auxiliary coefficients, $\tilde{c}_u(n)$ and $\tilde{d}_u(j,n)$, as follows:

$$\tilde{c}_u(n) = \frac{\Delta A_c(n)}{|c_u(n)|} c_u(n),\ \tilde{d}_u(j, n) = \frac{\Delta A_d(j, n)}{|d_u(j, n)|} d_u(j, n). \tag{30}$$

Then, the adjoint source expression of equation (29) can be written as $$\frac{\partial J_A}{\partial u} = -\sum_r \int dt \left[ \sum_{n=-\infty}^{+\infty} \Re[\tilde{c}_u(n)]\phi_r(t-n) + \sum_{j=0}^{+\infty}\sum_{n=-\infty}^{+\infty} 2^{\frac{j}{2}} \Re[\tilde{d}_u(n)]\psi_r(2^j t - n) + \sum_{n=-\infty}^{+\infty} \Im[\tilde{c}_u(n)]\phi_I(t-n) + \sum_{j=0}^{+\infty}\sum_{n=-\infty}^{+\infty} 2^{\frac{j}{2}} \Im[\tilde{d}_u(n)]\psi_I(2^j t - n) \right]. \tag{31}$$

Again, the term inside brackets is the reconstruction formula using the rescaled modeled coefficients. Those skilled in the art, based on the disclosures provided herein, would be empowered to develop other cost functions based on the latest developments of DTCWT transform, or similar transforms.

However, despite the considerable success of the wavelet transform, various research groups have shown in the past that classical multiresolution ideas are far from being universally effective. Thus, the researchers have sought alternatives to wavelet analysis. For example, in signal processing, interesting phenomena occur along curves or sheets, e.g., edges in a two-dimensional image, for which the wavelets are ill suited for detecting, organizing, or providing a compact representation of intermediate dimensional structures. Thus, better adapted alternatives for investigating such events have been researched by combining ideas from geometry with ideas from traditional multiscale analysis, one of which is the curvelet transform. Conceptually, the curvelet transform is a multiscale pyramid with many directions and positions at each length scale, and needle-shaped elements at fine scales. This pyramid is nonstandard, however. Curvelets have useful geometric features that set them apart from wavelets and the likes. For instance, curvelets obey a parabolic scaling relation which says that at scale $2^{-j}$, each element has an envelope which is aligned along a "ridge" of length $2^{-j/2}$ and width $2^{-j}$.

The curvelets efficiently address the following problems: (1) optimally sparse representation of objects with edges, which means that one can recover such objects from noisy data by curvelet shrinkage, (2) optimally sparse representation of wave propagators as the curvelets correctly model the geometry of wave propagation, which is specifically helpful for analyzing seismic data, and (3) optimal image reconstruction in severely ill-posed problems, i.e., they are appropriate for image reconstruction from noisy and incomplete tomographic data.

A curvelet transform is now discussed and has a spatial variable x, with a frequency-domain variable ω, and with r and θ being the polar coordinates in the frequency-domain, as introduced in [6]. A pair of windows W(r) and V(t), which are called the "radial window" and the "angular window" are introduced, which are smooth, non-negative, and real-valued. For each $j \geq j_0$, a frequency window $U_j$ is introduced, which is defined in the Fourier domain by:

$$U_j(r, \theta) = 2^{-3j/4} W(2^{-j} r) V\left(\frac{2^{\lfloor j/2 \rfloor}\theta}{2\pi}\right), \tag{32}$$

where [j/2] is the integer part of j/2. A waveform q (x) is defined by means of its Fourier transform, $\hat{\varphi}_j(\omega)=U_j(\omega)$. The waveform is the "mother" of the curvelets in the sense that all the curvelets at scale $2^{-j}$ are obtained by rotations and translations of the mother curvelet.

Rotations and translations are introduced for generating other curvelets from the mother curvelet. The rotation angle is defined as $\theta_l=2\cdot 2^{-\lfloor j/2 \rfloor}\cdot l$, with l being a natural number and the rotation angle being between zero and 180 degrees. The translation k is defined as $k=(k_1, k_2)\in Z_2$. A curvelet is defined as a function of x at scale $2^{-j}$, orientation $\theta_l$, and position $$x_k^{(j,l)} = R_{\theta_l}^{-1}(k_1 \cdot 2^{-j}, k_2 \cdot 2^{-j/2})$$

by $$\varphi_{j,l,k}(x) = \varphi_j(R_{\theta_l}(x - x_k^{(j,l)})), \tag{33}$$

where $R_{\theta_l}$ is the rotation by θ radians and $$R_\theta^{-1}$$

is its inverse and is given by:

$$R_\theta = \begin{pmatrix} \cos\theta & \sin\theta \\ -\sin\theta & \cos\theta \end{pmatrix}. \tag{34}$$

A curvelet coefficient is them the inner product between an element fand a curvelet $\varphi_{j,l,k}$, i.e., $$c(j, l, k) := \langle f, \varphi_{j,l,k} \rangle = \int_{R^2} f(x)\overline{\varphi_{J,l,k}(x)}dx. \tag{35}$$

While equation (33) describes fine scale elements, coarse scale elements may also be introduced. A coarse scale curvelet is defined as:

$$\varphi_{j_0,k}(x) = \varphi_{j_0}(x - 2^{-j_0}k). \tag{36}$$

Thus, an arbitrary function f(x) can be expressed as a series of curvelets as follows:

$$f = \sum_{j,l,k} \langle f, \varphi_{j,l,k} \rangle \varphi_{j,l,k}. \tag{37}$$

The differences between the wavelet and the curvelet transformations having been discussed, and the basic framework for the curvelet transform having been introduced, novel curvelet domain cost functions for the FWI are now discussed.

A curvelet domain cost function for the seismic field uses two sets of curvelet coefficients, $c_u$(j, k, l) and $c_d$(j, k, l), associated with the modeled and real data, u(x) and d(x), respectively. The two sets of curvelets are defined as:

$$c_u(j, k, l) = \langle u(x), \varphi_{j,k,l}(x) \rangle = \int u(x)\overline{\varphi_{j,k,l}(x)}dx, \tag{38}$$

$$c_d(j, k, l) = \langle d(x), \varphi_{j,k,l}(x) \rangle = \int d(x)\overline{\varphi_{j,k,l}(x)}dx, \tag{39}$$

where $\varphi_{j,l,k}(x)$ is the curvelet function at scale j with position and orientation given by k and l.

The modeled and real data can be obtained from their curvelet coefficients through the reconstruction formula:

$$u(x) = \sum_{j,k,l} c_u(j, k, l)\varphi_{j,k,l}(x), \tag{40}$$

and $$d(x) = \sum_{j,k,l} c_d(j, k, l)\varphi_{j,k,l}(x). \tag{41}$$

In these equations, $x \in \mathbb{R}^2$ and represents the time sample and channel in a shot gather.

Similar to what was done for the DTCWT case, these complex coefficients can be written $$c(j, k, l) = A(j, k, l)e^{i\theta(j,k,l)}, \tag{42}$$

with the amplitude given by:

$$A(j, k, l) = \left[\Re[c(j, k, l)]^2 + \Im[c(j, k, l)]^2\right]^{\frac{1}{2}} \tag{43}$$

and the phase given by:

$$\theta(j, k, l) = \arctan\left[\frac{\Im[c(j, k, l)]}{\Re[c(j, k, l)]}\right], \tag{44}$$

thus, allowing to define FWI cost functions which focus specifically on the phase θ and/or amplitude A of the curvelet coefficients of the shot gather. In these equations, $\Re$[v] and $\Im$[v] represent the real and imaginary part of the complex number v, respectively.

A phase cost function, $J_\theta$, may be defined as:

$$J_\theta(u, d) = \frac{1}{2}\sum_r \sum_{j,k,l} [\Delta\theta(j, k, l)]^2, \tag{45}$$

where r denotes the number of receiver gathers. The dependence on (j, k, l) and on (x) have been omitted to improve readability.

Following the adjoint-state method described above, it is possible to write the adjoint-source as:

$$\frac{\partial J_\theta}{\partial u} = -\sum_r \int dt \Re\left[\sum_{j,k,l} \frac{\Delta\theta}{A_u^2} i c_u \phi_{j,k,l}\right]. \tag{46}$$

The amplitude cost function, $J_A$, for the curvelet domain may be defined as:

$$J_A(u, d) = \frac{1}{2}\sum_r \sum_{j,k,l} [\Delta A(j, k, l)]^2, \tag{47}$$

with $$\Delta A(j, k, l) = A_d(j, k, l) - A_u(j, k, l). \tag{48}$$

The adjoint source for this cost function can be shown to be:

$$\frac{\partial J_A}{\partial u} = -\sum_r \int dt \Re\left[\sum_{j,k,l} \frac{\Delta A}{A_u} c_u \phi_{j,k,l}\right]. \tag{49}$$

One can use either of the cost functions described by equations (45) and (47) in the FWI processing. In one application, it is possible to use a combination of the two cost functions, for example, a weighted sum of the two.

Figures 3A, 3B:
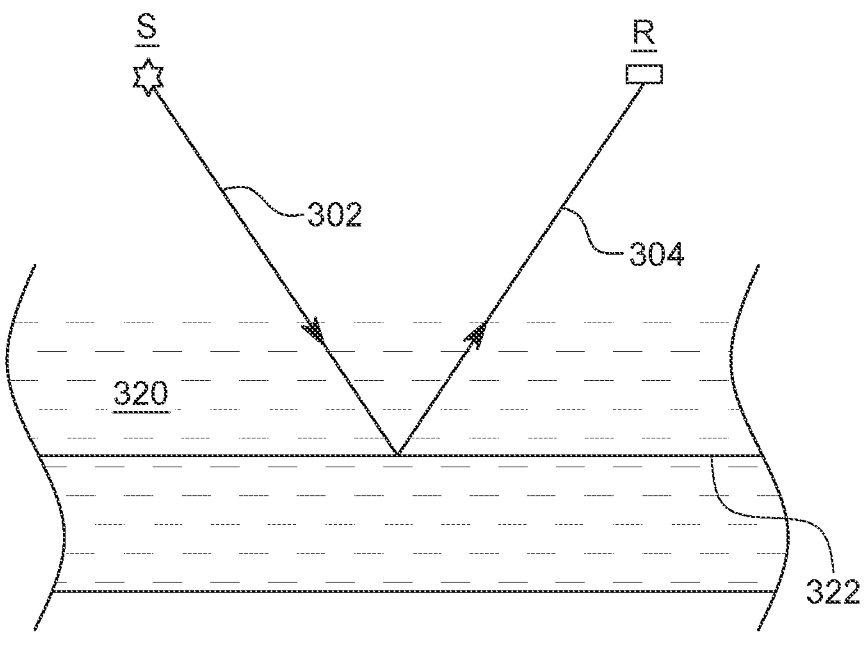
FIGS. 3A and 3B schematically illustrate the concept of adjoint source in the subsurface.

The adjoint source method is conceptually illustrated in FIGS. 3A and 3B. FIG. 3A shows a source S and a receiver R located at the surface. A wavefield 302, generated by the source S, propagates into the subsurface 320 and reflects from a formation 322, and then it propagates as scattered wavefield 304 toward the receiver R, where it is recorded as recorded data d. The adjoint source S' is considered to be a source located at the receiver R, and generating a wavefield 306 (that corresponds to the adjoint source computed in equation (24), (28), (45), or (47)), and this field reflects at the formation 322 and then propagates as a scattered wavefield 308 to the location of the actual source S. Note that the path of the wavefields 306 and 308 follows the same path as the wavefields 302 and 304, but in reverse order. When an image l of the subsurface is calculated, the forward propagated wavefield 302 of the source S is cross-correlated with the backward propagated wavefield 306 of the adjoint source S' and this image is used, as discussed later, to update the velocity model with the FWI process. Thus, being able to calculate the adjoint source with equation (25), (29), (46), or (49) is necessary for these novel cost functions.

Figure 4:
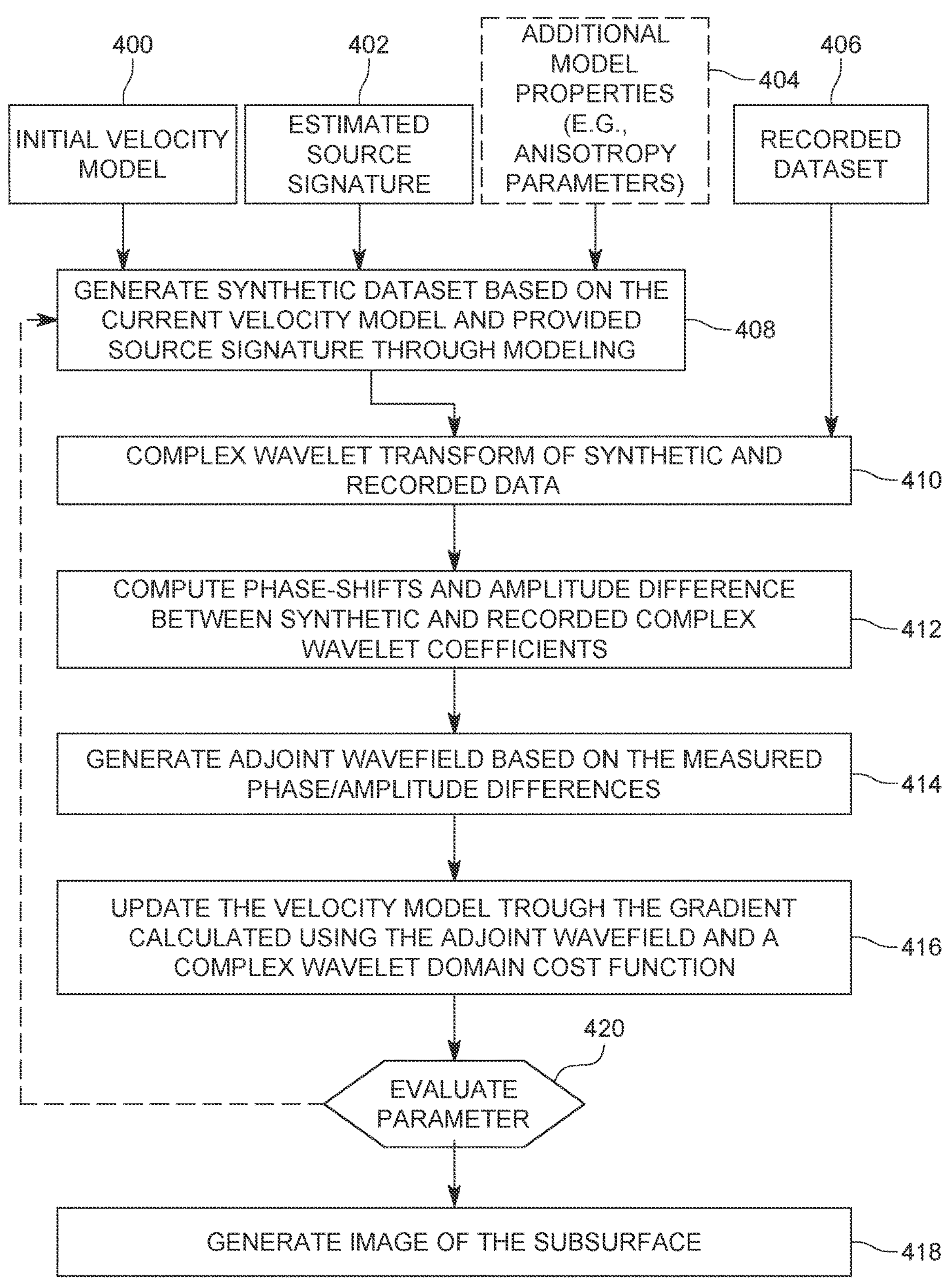
FIG. 4 is a flow chart of a method for imaging a formation in a subsurface by using a curvelet domain cost function in the FWI.

A method for generating an image of the formation 322, in FIGS. 3A and 3B, based on the recoded seismic data d, a velocity model of the subsurface, one of the new cost functions discussed above, and the FWI process is now discussed with regard to FIG. 4. The method starts with step 400 (may also start with step 406) of receiving or generating an initial velocity model V. The initial velocity model V may be obtained from another seismic survey or from studies performed in the area of interest. In step 402, a source signature of the source S (see FIGS. 3A and 3B) is estimated. In this regard, there are many known methods for calculating the source signature of a physical source, which may be, for example, an array of air guns or a vibratory source. Optionally, in step 404, additional velocity model parameters may be received, for example, anisotropy parameters density, shear wave velocity, etc. In this regard, note that the initial velocity model is typically based on the pressure-wave velocity $v_p$ of the subsurface. However, the velocity model may also include the shear-wave velocity $v_s$, and/or the density of the subsurface, and any other parameter of the subsurface. In step 406, the recorded seismic data dis received.

In step 408, a synthetic data set u of the substrate is generated, based on the current velocity model V and the source signature, which is provided by modeling. The synthetic data set u is schematically illustrated in FIG. 3A, i.e., the wavefields 302 and 304 are calculated based on the source signature of the source S. In step 410, a complex wavelet transform (i.e., the DTCWT defined by equations (14) to (23) or the curvelet transform defined by equations (32) to (49) is used to transform both the recorded data d and the synthetic data u, into complex wavelet transformed recorded data d' and complex wavelet transformed synthetic data u'.

In step 412, the method computes the phase and/or amplitude differences, which are used to construct the adjoint source, for each complex wavelet coefficient $c_u$, $c_d$, $d_u$, and $d_d$ of both the CW transformed synthetic dataset u' and the CW transformed recorded dataset d', and in step 414, the method generates the adjoint wavefield based on the computed phase and/or amplitude differences in step 412. Note that the differences calculated in step 412 are used for constructing the CW domain cost function J, which can be any of those described by equations (24), (28), (45), and (47). Each cost function Jis a function of both the CW transformed measured data d' and the CW transformed synthetic data u'. Also note that the generation of the adjoint wavefield is based on the adjoint-state equation (25) for the phase cost function, and equation (29) for the amplitude cost function for the DTCWT approach. For the Curvelet approach, the generation of the adjoint wavefield is based on the adjoint-state equation (46) for the phase cost function and equation (48) for the amplitude cost function. In step 416, the method updates, using FWI, the velocity model V. The updating step may rely, for example, on the gradient obtained through the cross-correlation between the forward propagated source wavefield 302 and the backward propagated adjoint source wavefield 306, which are schematically illustrated in FIGS. 3A and 3B. Then, in step 418, an image of the subsurface, including the formation 322 with which the wavefields have interacted, is generated based on the updated velocity model.

In step 420, an evaluation of a criterion is made and if a parameter is above a given limit or threshold, steps 408 through 416 are repeated. The criterion may be a predetermined amount of iterations or until a convergence criterion is met, e.g., cost function smaller than a predetermined threshold, using the updated velocity model. If the criterion is found to be below the limit, the method proceeds straight from step 416 to step 418.

Although the method of FIG. 4 has been discussed with regard to the FWI process, one skilled in the art would understand that the novel cost functions may be used in a different context, for example, during a data domain least square migration process, which is another seismic process that might use cost functions.

The method discussed above may be implemented in a computing device 500, which is discussed later. The computing device is configured for imaging a formation 322 into a subsurface 320. The computing device includes an interface configured to receive an initial velocity model V of the subsurface 320, and to receive recorded data d related to the subsurface, and a processor connected to the interface. The processor is configured to generate synthetic data u related to the subsurface, using the initial velocity model V and a source signature of a source S, which is used to generate waves into the subsurface, transform the recorded data d and the synthetic data u with a complex wavelet transform into complex wavelet transformed recorded data d' and complex wavelet transformed synthetic data u', respectively, update the initial velocity model V using a full waveform inversion, FWI, to generate an updated velocity model, based on a cost function J which depends on the complex wavelet transformed recorded data d' and the complex wavelet transformed synthetic data u', and generate an image of the formation in the subsurface based on the updated velocity model, wherein the formation is used to locate natural resources.

The processor is further configured to calculate the cost function Jas only including phase shifts of the complex wavelet transformed recorded data d' and the complex wavelet transformed synthetic data u', and/or calculate the cost function Jas only including amplitude differences of the complex wavelet transformed recorded data d' and the complex wavelet transformed synthetic data u', and/or calculate the cost function Jas phase shifts and amplitude differences of the complex wavelet transformed recorded data d' and the complex wavelet transformed synthetic data u'. In one application, the complex wavelet transform is different from a wavelet transform as the curvelet transform describes a surface singularity and the wavelet transform describes a single point singularity. The complex wavelet transform may be a double tree complex wavelet transform or a curvelet transform.

The processor is further configured to compute an adjoint wavefield for an adjoint source S', at a receiver position, where the data d is recorded, based on the cost function J, where the adjoint wavefield is calculated as a derivative of the cost function J with a phase or an amplitude. The processor is further configured to calculate a cross-correlation between a forward propagated source wavefield and a backward propagated adjoint source wavefield, and use a gradient obtained from the cross-correlation to update the initial velocity model.

The method described with regard to FIG. 4 may be applied to the field of subsurface exploration, for example, hydrocarbon exploration and development, geothermal exploration and development, and carbon capture and sequestration, or other natural resource exploration and exploitation. It could also be employed for surveying and monitoring for windfarm applications, both onshore and offshore, and also for medical imaging applications.

Figure 5:
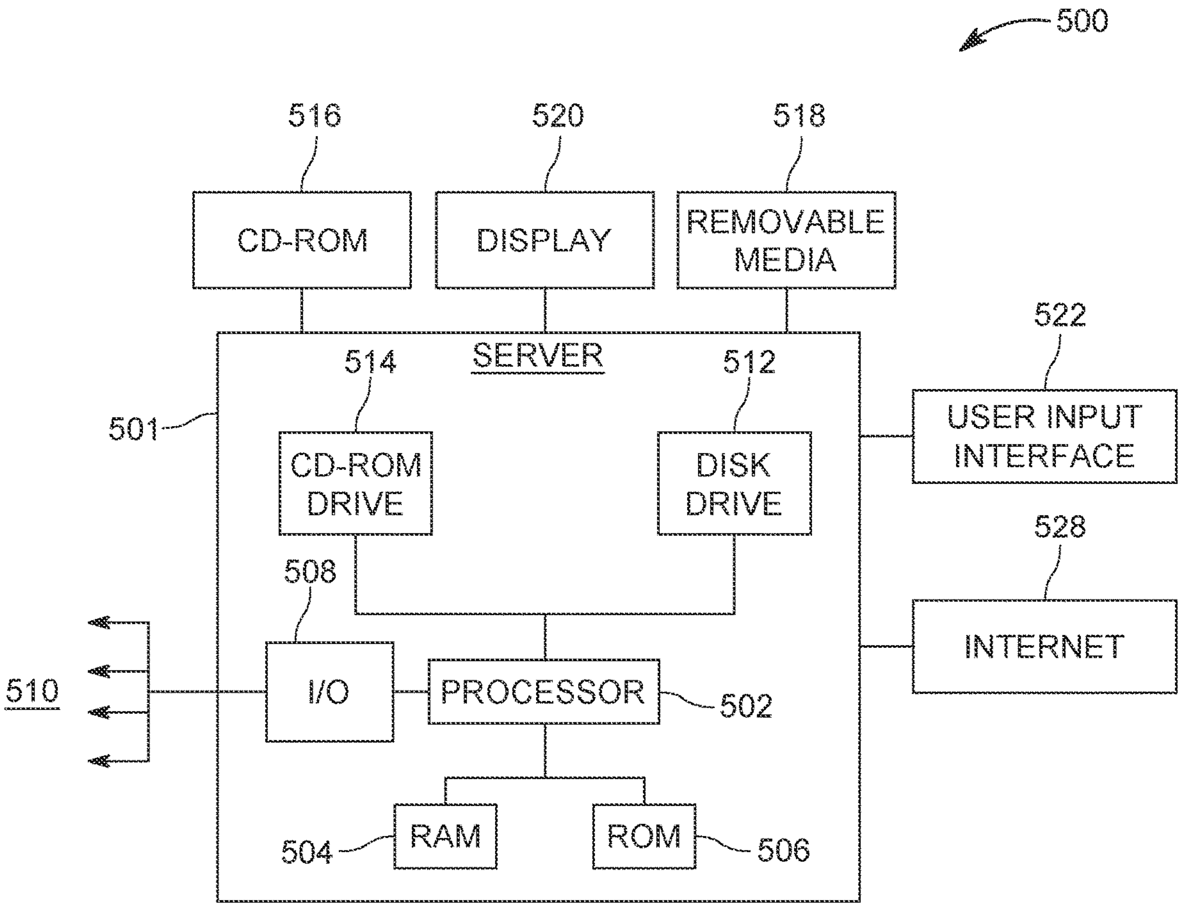
FIG. 5 is a schematic diagram of a computing device that is configured to implement the methods discussed herein.

The above-discussed procedures and methods may be implemented in a computing device as illustrated in FIG. 5. Hardware, firmware, software or a combination thereof may be used to perform the various steps and operations described herein. The computing device 500 is suitable for performing the activities described in the above embodiments and may include a server 501. Such a server 501 may include a central processor (CPU) 502 coupled to a random access memory (RAM) 504 and to a read-only memory (ROM) 506. ROM 506 may also be other types of storage media to store programs, such as programmable ROM (PROM), erasable PROM (EPROM), etc. Processor 502 may communicate with other internal and external components through input/output (I/O) circuitry 508 and bussing 510 to provide control signals and the like. Processor 502 carries out a variety of functions as are known in the art, as dictated by software and/or firmware instructions.

Server 501 may also include one or more data storage devices, including hard drives 512, CD-ROM drives 514 and other hardware capable of reading and/or storing information, such as DVD, etc. In one embodiment, software for carrying out the above-discussed steps may be stored and distributed on a CD-ROM or DVD 516, a USB storage device 518 or other form of media capable of portably storing information. These storage media may be inserted into, and read by, devices such as CD-ROM drive 514, disk drive 512, etc. Server 501 may be coupled to a display 520, which may be any type of known display or presentation screen, such as LCD, plasma display, cathode ray tube (CRT), etc. A user input interface 522 is provided, including one or more user interface mechanisms such as a mouse, keyboard, microphone, touchpad, touch screen, voice-recognition system, etc.

Server 501 may be coupled to other devices, such as sources, sensors, or any other seismic data system. The server may be part of a larger network configuration as in a global area network (GAN) such as the Internet 528, which allows ultimate connection to various landline and/or mobile computing devices.

As described above, the apparatus 500 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processor 502 may be configured to execute instructions stored in the memory device 504 or otherwise accessible to the processor. Alternatively, or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The term "about" is used in this application to mean a variation of up to 20% of the parameter characterized by this term.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide various cost functions to be used with FWI or migration processes while the cost functions are expressed in a complex wavelet domain. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Bunks, C., F. M. Saleck, S. Zaleski, and G. Chavent, 1995, Multiscale seismic waveform inversion: Geophysics, 60, 1457-1473.

[2] Daubechies, I., 1988, Orthonormal bases of compactly supported wavelets: Comm. Pure Appl. Math., 41, 909-996.

[3] Mallat, S., 1989, A theory for multiresolution signal decomposition: The wavelet representation: IEEE Transactions on Pattern Analysis & Machine Intelligence, 11, 674-693.

[4] Kingsbury, N., 2001, Complex Wavelets for Shift Invariant Analysis and Filtering of Signals: Applied and Computational Harmonic Analysis, 10, 234-253.

[5] Selesnick, I. W., Baraniuk R. G. and N. C. Kingsbury, 2005, The dual-tree complex wavelet transform: IEEE Signal Processing Magazine, 22, 123-151.

[6] Candès, E., L. Demanet, D. Donoho, and L. Ying, 2006, Fast Discrete Curvelet Transforms: Multiscale Modeling & Simulation, 5, 861-899.

[7] Michael Warner, John Armitage, Adrian Umpleby, Nikhil Shah, Henry Debens, and Fabio Mancini, 2022, Full-elastic AVA extraction using acoustic FWI, SEG Technical Program Expanded Abstracts, 907-911.

[8] Ren, Zhiming, Liu, Yang, Zhang, Qunshan, 2014, Multiscale viscoacoustic waveform inversion with the second generation wavelet transform and adaptive time-space domain finite-difference method, Geophysical Journal International, 197, 948-974

[9] Dong Li, Suping Peng, Xingguo Huang, Yinling Guo, Yongxu Lu, Xiaoqin Cui, 2021, Time-lapse full waveform inversion based on curvelet transform: Case study of CO2 storage monitoring, International Journal of Greenhouse Gas Control, 110, 103417.

[10] Hu, Yong, Han, Liguo, Wu, Rushan, Xu, Yongzhong, Multi-scale time-frequency domain full waveform inversion with a weighted local correlation-phase misfit function: Journal of Geophysics and Engineering, 2019, 16, 1017-1031.

[11] Bozdağ, E., Trampert, J., Tromp, J., 2011, Misfit functions for full waveform inversion based on instantaneous phase and envelope measurements: Geophysical Journal International, 185, 845-870.

[12] Plessix, R. E., 2006, A review of the adjoint-state method for computing the gradient of a functional with geophysical applications: Geophysical Journal International, 167, 495-503.

What is claimed is:

1. A method for seismic exploration of a subsurface using a full waveform inversion, FWI, the method comprising:

receiving an initial velocity model V of the subsurface;

receiving recorded seismic data d related to the subsurface, wherein the recorded seismic data d represents a recorded wavefield of physical seismic waves detected by sensors;

generating synthetic data u representing a synthetic wavefield related to the subsurface, using the initial velocity model V and a source signature of a source S, which is used to generate waves into the subsurface;

transforming the recorded wavefield and the synthetic wavefield, with a complex wavelet transform, into complex wavelet transformed recorded data d' and complex wavelet transformed synthetic data u', respectively, to separate kinematics of the recorded and synthetic wavefields from dynamics of the recorded and synthetic wavefields trough phase and amplitude components;

updating the initial velocity model V using the FWI to generate an updated velocity model, based on a cost function J which depends on the complex wavelet transformed recorded data d' and the complex wavelet transformed synthetic data u', wherein the updating comprises:

(i) simulating a physical time-reversal of wave propagation by computing an adjoint wavefield for an adjoint source S' at a receiver position where the recorded seismic data d is recorded, wherein the adjoint wavefield is computed as a derivative of the cost function J with respect to phase or amplitude to isolate kinematic errors;

(ii) calculating a cross-correlation between a forward propagated source wavefield and the computed adjoint wavefield to generate a gradient; and (iii) updating the initial velocity model V using the gradient to mitigate a non-linearity related to cross-contamination of kinematic and dynamic effects in the velocity model; and generating an image of a surveyed subsurface formation in the subsurface based on the updated velocity model, wherein the formation is used to locate natural resources.

2. The method of claim 1, further comprising:

calculating the cost function J as a function dependent only on the phase shifts of the complex wavelet transformed recorded data d' and the complex wavelet transformed synthetic data u'.

3. The method of claim 1, further comprising:

calculating the cost function J as a function dependent only on the amplitude differences of the complex wavelet transformed recorded data d' and the complex wavelet transformed synthetic data u'.

4. The method of claim 1, further comprising:

calculating the cost function J as a function dependent on the phase shifts and amplitude differences of the complex wavelet transformed recorded data d' and the complex wavelet transformed synthetic data u'.

5. The method of claim 1, wherein the complex wavelet transform is a double tree complex wavelet transform or a curvelet transform.

6. A computing device for imaging a formation into a subsurface, the computing device comprising:

an interface configured to receive an initial velocity model V of the subsurface, and to receive recorded seismic data d related to the subsurface, wherein the recorded seismic data d represents a recorded wavefield of physical seismic waves detected by sensors; and a processor connected to the interface and configured to, generate synthetic data u representing a synthetic wavefield related to the subsurface, using the initial velocity model V and a source signature of a source S, which is used to generate waves into the subsurface;

transform the recorded wavefield and the synthetic wavefield, with a complex wavelet transform, into complex wavelet transformed recorded data d' and complex wavelet transformed synthetic data u', respectively, to separate kinematics of the recorded and synthetic wavefields from dynamics of the recorded and synthetic wavefields trough phase and amplitude components;

update the initial velocity model V using a full waveform inversion, FWI, to generate an updated velocity model, based on a cost function J which depends on the complex wavelet transformed recorded data d' and the complex wavelet transformed synthetic data u', wherein the updating comprises:

(i) simulating a physical time-reversal of wave propagation by computing an adjoint wavefield for an adjoint source S' at a receiver position where the recorded seismic data d is recorded, wherein the adjoint wavefield is computed as a derivative of the cost function J with respect to phase or amplitude to isolate kinematic errors;

(ii) calculating a cross-correlation between a forward propagated source wavefield and the computed adjoint wavefield to generate a gradient; and (iii) updating the initial velocity model V using the gradient to mitigate a non-linearity related to cross-contamination of kinematic and dynamic effects in the velocity model; and generate an image of the formation in the subsurface based on the updated velocity model, wherein the formation is used to locate natural resources.

7. The device of claim 6, wherein the processor is further configured to:

calculate the cost function J as only including phase shifts of the complex wavelet transformed recorded data d' and the complex wavelet transformed synthetic data u'.

8. The device of claim 6, wherein the processor is further configured to:

calculate the cost function J as only including amplitude differences of the complex wavelet transformed recorded data d' and the complex wavelet transformed synthetic data u'.

9. The device of claim 6, wherein the processor is further configured to:

calculate the cost function J as phase shifts and amplitude differences of the complex wavelet transformed recorded data d' and the complex wavelet transformed synthetic data u'.

10. The device of claim 6, wherein the complex wavelet transform is different from a wavelet transform as the curvelet transform describes a surface singularity and the wavelet transform describes a single point singularity.

11. The device of claim 6, wherein the complex wavelet transform is a double tree complex wavelet transform or a curvelet transform.

12. A non-transitory computer readable medium including computer executable instructions, wherein the instructions, when executed by a processor, implement a method for imaging a formation in a subsurface, the medium comprising instructions for:

receiving an initial velocity model V of the subsurface;

receiving recorded seismic data d related to the subsurface, wherein the recorded seismic data d represents a recorded wavefield of physical seismic waves detected by sensors;

generating synthetic data u representing a synthetic wavefield related to the subsurface, using the initial velocity model V and a source signature of a source S, which is used to generate waves into the subsurface;

transforming the recorded wavefield and the synthetic wavefield, with a complex wavelet transform, into complex wavelet transformed recorded data d' and complex wavelet transformed synthetic data u', respectively, to separate kinematics of the recorded and synthetic wavefields from dynamics of the recorded and synthetic wavefields trough phase and amplitude components;

updating the initial velocity model V using a full waveform inversion, FWI, to generate an updated velocity model, based on a cost function J which depends on the complex wavelet transformed recorded data d' and complex wavelet transformed synthetic data u', wherein the updating comprises:

(i) simulating a physical time-reversal of wave propagation by computing an adjoint wavefield for an adjoint source S' at a receiver position where the recorded seismic data d is recorded, wherein the adjoint wavefield is computed as a derivative of the cost function J with respect to phase or amplitude to isolate kinematic errors;

(ii) calculating a cross-correlation between a forward propagated source wavefield and the computed adjoint wavefield to generate a gradient; and (iii) updating the initial velocity model V using the gradient to mitigate a non-linearity related to cross-contamination of kinematic and dynamic effects in the velocity model; and generating an image of the formation in the subsurface based on the updated velocity model, wherein the formation is used to locate natural resources.

* * * * *